US010718264B2

(12) United States Patent
Huynh

(10) Patent No.: US 10,718,264 B2
(45) Date of Patent: Jul. 21, 2020

(54) INLET DIFFUSERS FOR JET ENGINES, JET ENGINES, JET AIRCRAFT, AND METHODS FOR DIFFUSING INCOMING AIR OF JET ENGINES

(71) Applicant: The Boeing Company, Chicago, IL (US)

(72) Inventor: Thuy Huynh, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 126 days.

(21) Appl. No.: 15/924,031

(22) Filed: Mar. 16, 2018

(65) Prior Publication Data

US 2019/0284996 A1 Sep. 19, 2019

(51) Int. Cl.
*F02C 7/042* (2006.01)
*B64D 33/02* (2006.01)
*F02C 7/04* (2006.01)

(52) U.S. Cl.
CPC .............. *F02C 7/042* (2013.01); *B64D 33/02* (2013.01); *F02C 7/04* (2013.01); *B64D 2033/0226* (2013.01); *B64D 2033/0273* (2013.01); *F05D 2220/323* (2013.01); *F05D 2240/127* (2013.01)

(58) Field of Classification Search
None
See application file for complete search history.

(56) References Cited

U.S. PATENT DOCUMENTS 2,477,637 A 8/1949 Mercier
2,772,620 A 12/1956 Ferri
2,939,274 A * 6/1960 Olson ........................ F02K 1/06 239/265.39
2,969,939 A * 1/1961 Sulkin ..................... F02C 7/057 244/53 B
2,984,305 A * 5/1961 Ranson ................... B64C 27/18 416/22
2,989,846 A * 6/1961 Hausammann ......... F02C 7/057 137/15.2

(Continued)

OTHER PUBLICATIONS

European Patent Office, Extended European Search Report for related European Patent Application No. 19156786, dated Sep. 2, 2019.

*Primary Examiner* — Michael Lebentritt

(74) *Attorney, Agent, or Firm* — Dascenzo Intellectual Property Law, P.C.

(57) ABSTRACT

An inlet diffuser for a jet engine and methods for mixing boundary layers of air in compact inlet diffusers with high offset and high aspect ratio apertures are disclosed. The inlet diffuser includes an inlet diffuser body that includes elongate structures that are configured to allow a first portion of boundary layer air located between the elongate structures to flow within a channel, restrict the first portion of boundary layer air from flowing across either elongate structure, and allow a second portion of boundary layer air located outboard of the elongate structures to flow across the elongate structures and into a region of internal volume inward of the channel, wherein the second portion of boundary layer air is pushed away from the internal surface of the diffuser body by the elongate structures as the second portion of boundary layer air flows across the elongate structures in an inboard direction.

22 Claims, 7 Drawing Sheets

(56) References Cited

U.S. PATENT DOCUMENTS

| | | | | |
|---|---|---|---|---|
| 3,208,214 | A * | 9/1965 | Servanty | F02K 7/02 60/249 |
| 3,227,240 | A * | 1/1966 | Lee | B64F 1/26 181/217 |
| 3,258,913 | A * | 7/1966 | Moorehead | F02C 7/042 239/265.43 |
| 3,430,640 | A * | 3/1969 | Lennard | F02C 7/042 137/15.1 |
| 3,824,787 | A * | 7/1974 | Etessam | F02K 7/075 60/248 |
| 4,058,141 | A | 11/1977 | Hasinger et al. | |
| 4,113,019 | A * | 9/1978 | Sobolev | F02C 6/04 169/12 |
| 4,316,721 | A * | 2/1982 | Weiss | B63H 11/04 239/265.19 |
| 4,989,807 | A * | 2/1991 | Foreman | B64D 33/02 138/39 |
| 5,014,508 | A * | 5/1991 | Lifka | B64G 1/401 60/224 |
| 5,191,761 | A * | 3/1993 | Janeke | B64G 1/14 60/224 |
| 5,255,513 | A * | 10/1993 | Kutschenreuter, Jr. | F02K 7/10 60/204 |
| 5,937,908 | A | 8/1999 | Inoshiri et al. | |
| 7,364,011 | B2 * | 4/2008 | Hirschorn | F01N 1/082 180/309 |
| 8,292,217 | B2 * | 10/2012 | Smith | B64C 30/00 244/53 B |
| 2002/0117581 | A1 * | 8/2002 | Sanders | F02C 7/042 244/53 B |
| 2006/0000943 | A1 * | 1/2006 | Ouellette | B64C 9/38 244/35 R |
| 2006/0069533 | A1 * | 3/2006 | Florea | F01D 5/145 703/1 |
| 2017/0284415 | A1 * | 10/2017 | Wirth | F02K 3/06 |
| 2018/0347462 | A1 * | 12/2018 | Cicchini | F02C 7/04 |

* cited by examiner

INLET DIFFUSERS FOR JET ENGINES, JET ENGINES, JET AIRCRAFT, AND METHODS FOR DIFFUSING INCOMING AIR OF JET ENGINES

FIELD

The present disclosure relates to inlet diffusers for jet engines.

BACKGROUND

Aircraft propulsion systems may use an inlet diffuser to govern the introduction of ambient air into the aircraft engine. To reduce the drag forces created by an inlet diffuser, and to allow the inlet diffuser to be more efficiently integrated into the aircraft design, some current aircraft propulsion systems use high aspect ratio inlets that have a very wide opening which transitions to a circular engine face.

One important role of an inlet diffuser is to prevent boundary layer air from disrupting engine performance. Boundary layer air can cause total pressure recovery loss and total pressure distortions which can cause an engine to stall. To prevent this, some systems use a boundary layer diverter to prevent boundary layer air from entering the inlet diffuser. However, boundary layer diverters can reduce the aerodynamics of an aircraft, which slows down the speed and efficiency of an aircraft. Therefore, it is desired to have a new inlet diffuser for jet engines that prevents boundary layer air from disrupting engine performance while only minimally affecting the aerodynamics of the aircraft.

SUMMARY

Inlet diffusers for jet engines, jet engines, jet aircraft, and methods for diffusing incoming air of jet engines are disclosed.

An inlet diffuser for a jet engine includes an inlet diffuser body that defines an internal volume and an internal surface that faces the internal volume. The internal surface includes a fore region that is proximate to an inlet aperture to the internal volume for receiving incoming ambient air, and an aft region downstream of the fore region and proximate to an exit aperture by which air is delivered from the internal volume to a downstream portion of the jet engine. The inlet diffuser for a jet engine also includes a pair of elongate structures extending longitudinally along the internal surface from the fore region of the internal surface to the aft region of the internal surface. The pair of elongate structures defines a channel of the internal volume inboard of the elongate structures. The elongate structures are configured to (i) allow a first portion of boundary layer air located between the elongate structures to flow within the channel from the fore region to the aft region, (ii) restrict the first portion of boundary layer air from flowing across an elongate structure of the elongate structures, and (iii) allow a second portion of boundary layer air located outboard of the elongate structure of the elongate structures to flow across the elongate structure and into a region of the internal volume inward of the channel, wherein the second portion of boundary layer air is pushed away from the internal surface of the internal volume by the elongate structure as the second portion of boundary layer air flows across the elongate structure in an inboard direction.

A method for mixing boundary layers includes receiving air into an internal volume of the inlet diffuser via the inlet aperture; splitting, by a pair of elongate structures, a lower boundary layer of the air into a first portion of boundary layer air that is located between the elongate structures and second portion of boundary layer air that is located outboard of an elongate structure of the elongate structures; allowing, by the pair of elongate structures, the first portion of boundary layer air to flow within a channel of the internal volume inboard of the elongate structures; and restricting, by the pair of elongate structures, the first portion of boundary layer air from flowing across the elongate structure of the elongate structures. The method for mixing boundary layers further includes the pair of elongate structures allowing the second portion of boundary layer air to flow across the elongate structure and into a region of the internal volume inward of the channel; pushing the second portion of boundary layer air away from the internal surface of the internal volume as the second portion of boundary layer air flows across the elongate structure; and delivering the air to a downstream portion of the jet engine via an exit aperture to the internal volume.

The features, functions, and advantages that have been discussed can be achieved independently in various embodiments or may be combined in yet other embodiments further details of which can be seen with reference to the following description and drawings.

DESCRIPTION

Inlet diffusers for jet engines, jet engines, jet aircraft, and methods for mixing incoming boundary layer air of inlet diffusers are disclosed. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

Figure 1:
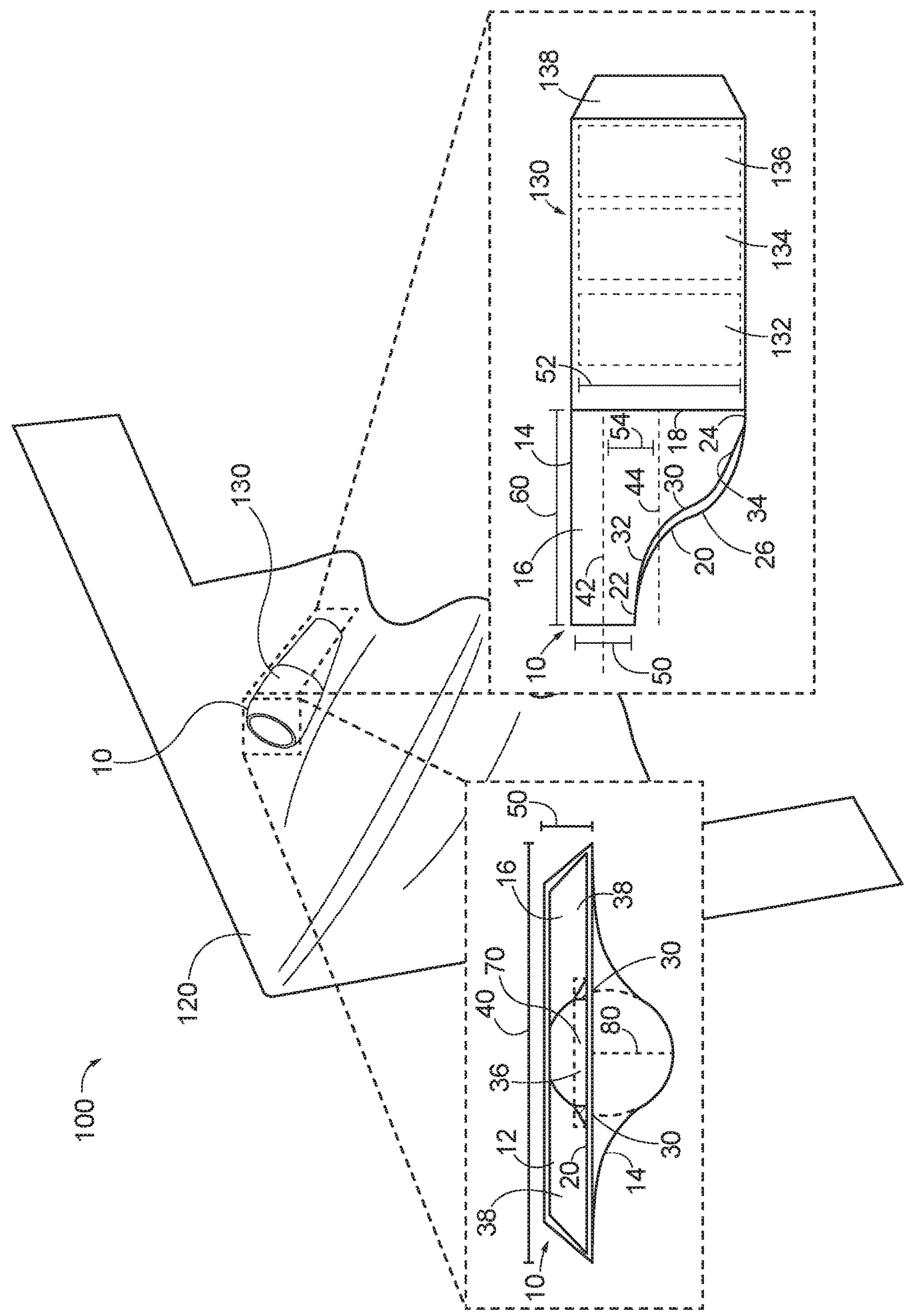
FIG. 1 is a detailed schematic and perspective view of an example aircraft employing the inlet diffusers according to the present disclosure.

FIG. 1 is a schematic and perspective view of illustrative, non-exclusive example of an aircraft 100 using inlet diffusers 10 according to the present disclosure. For example, and as schematically illustrated in FIG. 1, aircraft 100 may include an aircraft body 120 to which one or more engines 130 are secured, such as to provide thrust to aircraft 100. Engines 130 may include jet engines and may be referred to herein as jet engines 130. For example, engine 130 may be a gas turbine engine that includes elements such as a compressor 132, a burner 134, a turbine 136, an exit nozzle 138, etc. Inlet diffusers 10 may be operatively connected to engines 130 to govern ambient air that is allowed to pass into the engine 130. Aircraft 100 generally may be utilized to transport persons, cargo, and/or other payload, and may be a commercial aircraft, a military aircraft, etc. An aircraft 100 that utilizes at least one engine 130 according to the present disclosure generally may be configured to operate at subsonic speeds, and/or supersonic speeds.

As schematically illustrated in FIG. 1, inlet diffusers 10 include a diffuser body 14 that defines an internal volume 16, an inlet aperture 12 by which ambient air enters the internal volume 16, and an exit aperture 18 by which air passes from the internal volume 16 of the inlet diffuser 10 to a downstream portion of the engine 130.

The inlet aperture 12 is shown in FIG. 1 as having a maximum width 40, a maximum height 50, and a high aspect ratio. In the present disclosure, the term high aspect ratio refers to the relationships between maximum width 40 and maximum height 50 where the maximum width 40 is at least 2, at least 3, at least 4, or at least 5 times the maximum height 50. FIG. 1 also illustrates inlet aperture 12 as having a trapezoidal shape, however other shapes having a high aperture ratio may also be used, such as rectangles, ovoids, a circle segment, etc.

Exit aperture 18 is depicted in FIG. 1 as having a circular profile having a diameter 52; however other shapes also may be used. For example, a shape of exit aperture 18 may correspond to a shape of a downstream element of the engine 130 with which the exit aperture 18 interfaces. FIG. 1 also illustrates the inlet aperture 12 as being offset from the exit aperture 18 by an offset distance 54. In the present disclosure, the term offset is used to refer to the minimum translational distance between a normal 42 extending from a center point of a perpendicular cross section of the inlet aperture 12 and a normal 44 extending from a center point of a perpendicular cross section of the exit aperture 18, where the perpendicular cross section of the inlet aperture 12 and the perpendicular cross section of the exit aperture 18 are parallel planes.

The inlet diffuser 10 also includes an internal surface 20 that faces the internal volume 16. The internal surface 20 has a fore region 22 that is proximate to the inlet aperture 12 and an aft region 24 downstream of the fore region 22 and proximate to the exit aperture 18. The internal surface 20 has a centerline 80 that bisects the internal surface 20 and extends from the inlet aperture 12 to the exit aperture 18. In the present disclosure, the term outboard is used to represent a direction away from and perpendicular to the centerline 80 of the internal surface 20 parallel to the internal surface 20, and the term inboard is used to represent a direction toward and perpendicular to the centerline 80 of the internal surface 20 parallel to the internal surface 20.

According to the present disclosure, the internal surface 20 also includes an offset slope surface 26 that is downstream of the fore region 22. The offset slope surface 26 is a portion of the internal surface 20 that is sloped so as to compensate for the offset distance 54. In some examples, the offset nature of the inlet diffusers 10 may cause flow separation as air passes through the internal volume 16 of the inlet diffuser 10.

When ambient air enters the inlet diffuser 10, a boundary layer of air is formed along the internal surface 20 when ambient air enters the inlet diffuser 10. The boundary layer of air corresponds to the layer of air near the internal surface 20 in which a velocity changes from zero at the internal surface 20, to a velocity of the high energy airflow located away from the internal surface 20. As the boundary layer of air flows from the inlet aperture 12 to the exit aperture 18 along the internal surface 20, a portion of the boundary layer of air may lift and move away from the internal surface 20. For example, a portion of the boundary layer of air may be pulled away from the internal surface 20 due to pressure differences between the lower velocity boundary layer air and the higher velocity high energy airflow. If this type of pulling/mixing occurs too far from the internal surface 20, it can create airflow total pressure distortions that may cause a jet engine 130 operationally coupled to the inlet diffuser 10 to stall.

To address this issue, inlet diffuser 10 of the present disclosure includes elongate structures 30 to enhance boundary layer mixing, minimize boundary layer airflow from lifting off internal surface 20, and reduce the likelihood of engines 130 from stalling due to such airflow pressure distortions. In the present disclosure, elongate structures 30 additionally or alternatively may be described as mixing devices or mixing structures. Certain embodiments disclosed herein are especially effective at minimizing such engine stalls in compact inlet diffusers with high offset and/or high aspect ratio apertures. The elongate structures 30 may include a pair of elongate structures 30 extending longitudinally along the internal surface 20. Each of the pair of elongate structures 30 includes a front end 32 that is located on the fore region 22 and a rear end 34 that is located on the aft region 24. In some embodiments, each of the pair of elongate structures 30 may be equally spaced from the centerline 80 of the internal surface 20. In some embodiments, the elongate structures 30 may be integrally formed with the internal surface 20 of the inlet diffuser 10. Alternatively or in addition, the elongate structures 30 may be coupled to the internal surface 20 via one or more coupling methods such as bonding, bolting, welding, etc. The elongate structures 30 may be composed of the same material as the internal surface 20, and/or one or more other materials.

The pair of elongate structures 30 defines a channel 70 of the internal volume 16 inboard of the elongate structures 30. For example, the channel 70 may be a subvolume of the internal volume 16 that is bordered on three elongate sides by a first elongate structure, a portion of the internal surface 20, and a second elongate structure, with a fourth elongate side and the two opposing end sides of the channel 70 (proximate to the inlet aperture 12 and the exit aperture 18, respectively) being open to the internal volume 16.

According to the present disclosure, during operation and/or use of aircraft 100, the boundary layer of air within the internal volume 16 is split into a first portion 36 of boundary layer air and a second portion 38 of boundary layer air. For example, the boundary layer of air may be split by the front ends 32 of the elongate structures 30 into the first portion 36 of boundary layer air that is located between the elongate structures 30 (i.e., within the channel 70), and the second portion 38 of boundary layer air that is located outboard of the elongate structures 30 on a first outboard side of the elongate structures 30, a second outboard side of the elongate structures 30, or both. In this way, the first portion 36 of boundary layer air may be located between second portions 38 of boundary layer air.

The elongate structures 30 are configured to allow the first portion 36 of boundary layer air to flow along the internal surface 20 from the fore region 22 to the aft region 24. For example, the elongate structures 30 are configured to restrict air from flowing from the channel 70 in an outboard direction. For example, each elongate structure 30 may form a barrier on a respective outboard side of the channel 70 that prevents a flow of the first portion 36 of boundary layer air across the barrier. Additionally, the elongate structures 30 also may restrict, or in some instances prevent, the second portions 38 of boundary layer air from moving in an inboard direction into the channel 70. In this way, the elongate structures 30 allow the first portion 36 of boundary layer air to flow towards the exit aperture 18 without spreading in an outboard direction or being swept up by inboard movement of second portions 38 of boundary layer air.

Figure 5:
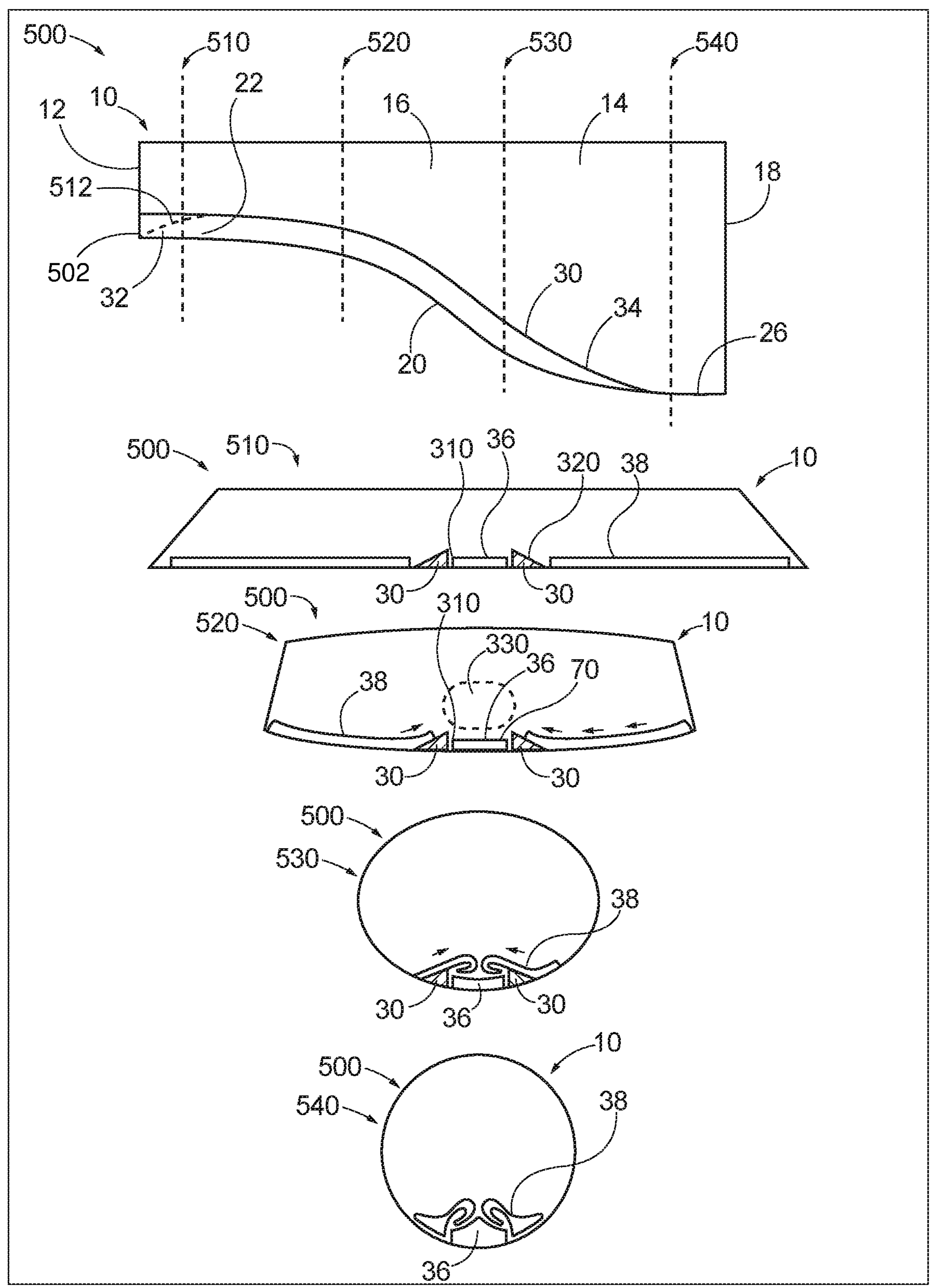
FIG. 5 is a composite diagram illustrating the performance of an inlet diffuser comprising a pair of elongate structures starting at or near the inlet aperture and having straight ramp edges.
Figure 6:
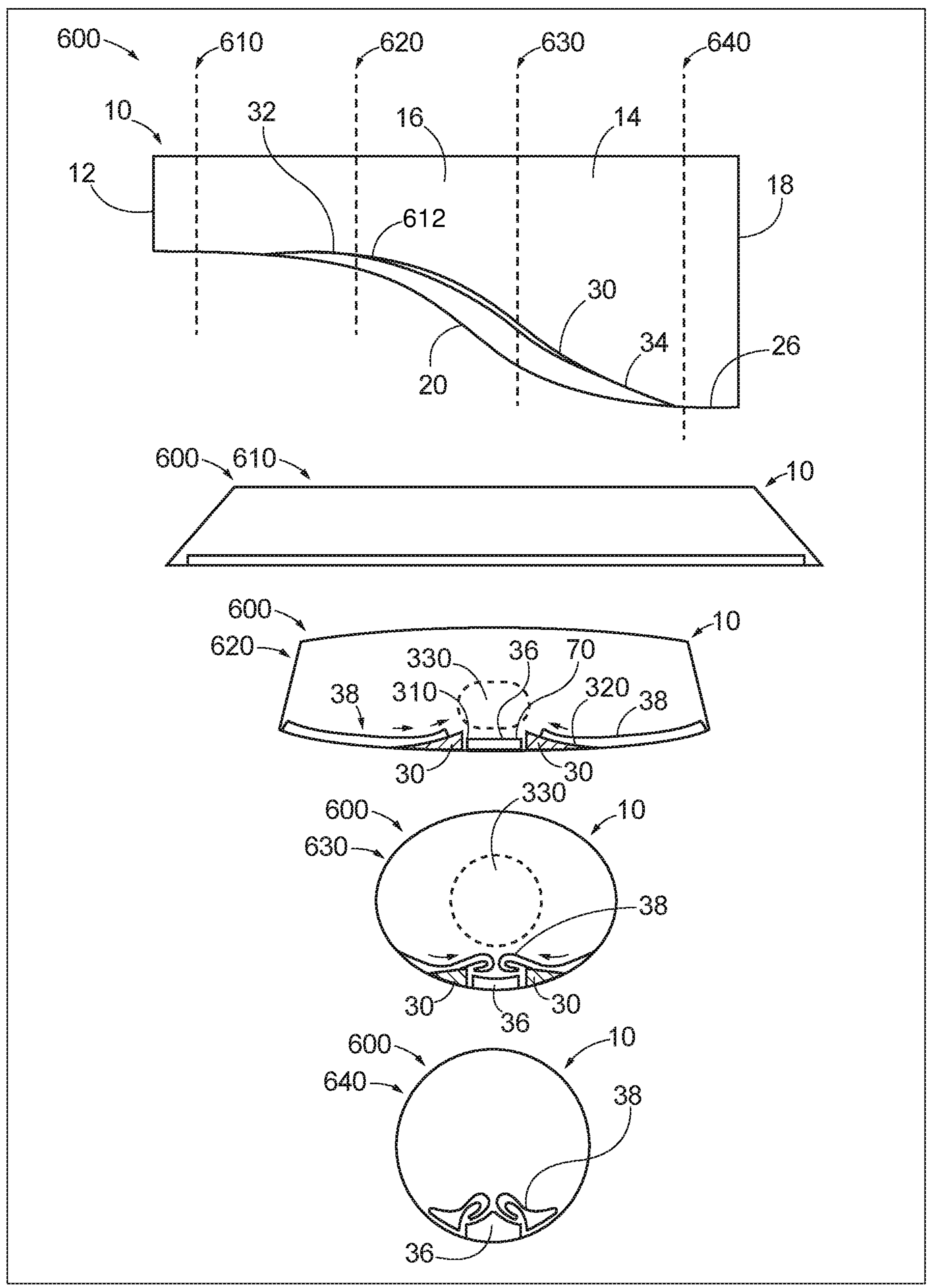
FIG. 6 is a composite diagram illustrating the performance of an inlet diffuser comprising a pair of elongate structures starting on an offset ramp surface of the inlet diffuser and having straight ramp edges.
Figure 7:
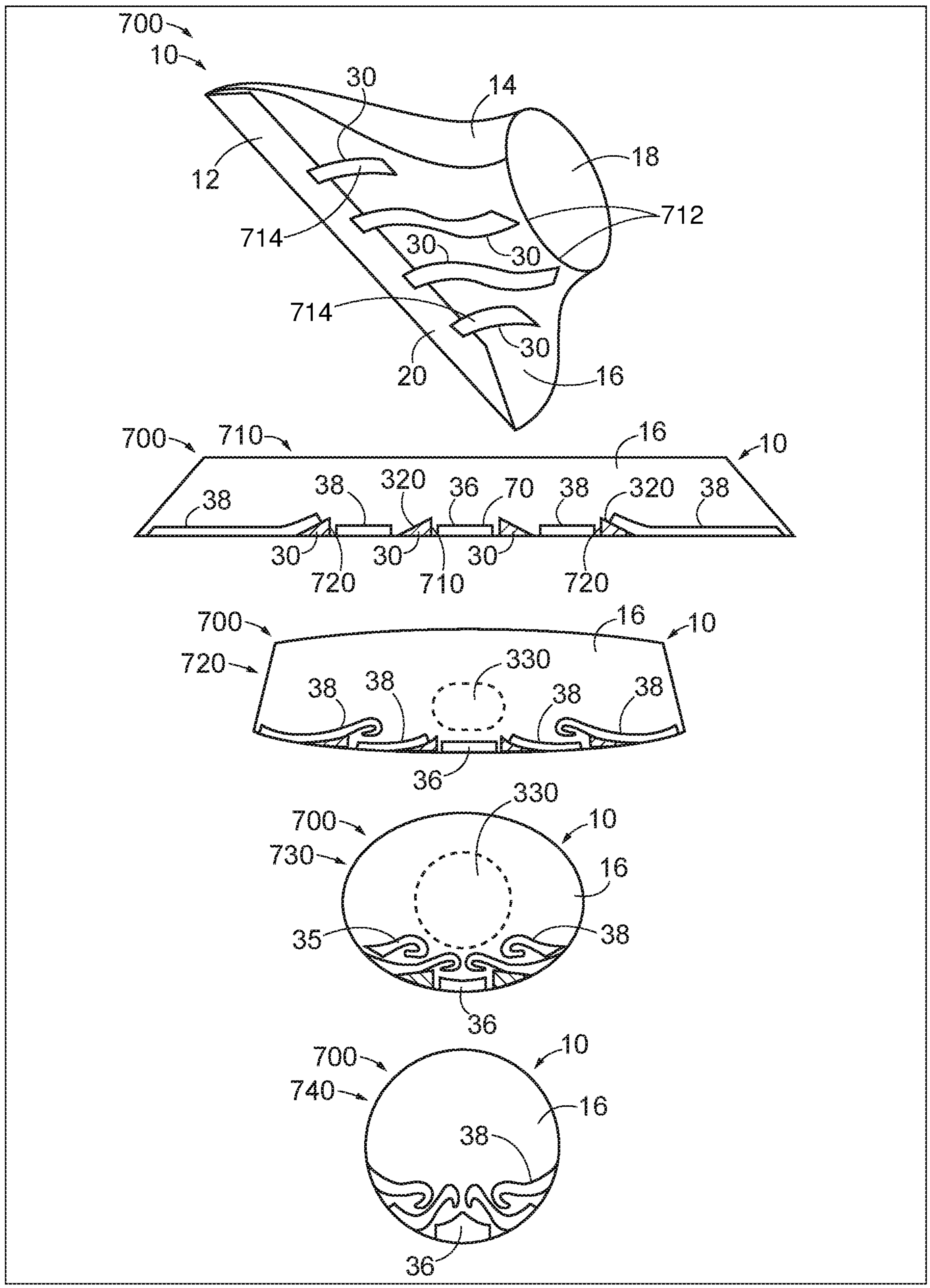
FIG. 7 is a composite diagram illustrating the performance of an inlet diffuser comprising two pairs of elongate structures having straight ramp edges.

According to the present disclosure, the elongate structures 30 also are configured so that second portions 38 of boundary layer air are allowed to move in an inboard direction across the elongate structures 30. Moreover, a ramp face of the elongate structures 30 is sloped so that second portions 38 of boundary layer air are pushed away from the internal surface 20 of the inlet diffuser 10 as they travel across the ramp face in an inboard direction. In this way, when a given second portion 38 of boundary layer air is displaced in an inboard direction across the elongate structures 30, it is guided by the surface of the corresponding elongate structure into a region of space inward of the first portion 36 of boundary layer air within the channel 70. Once the given second portion 38 of boundary layer air is introduced to the region of space inward of the first portion 36 of boundary layer air, it mixes with the high energy airflow that flows through the central regions of the internal volume 16. FIGS. 5-7 illustrate the gradual mixing of boundary layer air in various example embodiments of the inlet diffusers of the present disclosure. Because the sloped surface of the elongate structures 30 may extend along their entire length, the elongate structures 30 may facilitate a gradual mixing of the second portions 38 of boundary layer air along a length 60 of the inlet diffuser 10. In this way, the strength of the vortex caused by the mixing of the two portions of boundary layer air is reduced.

Figure 2:
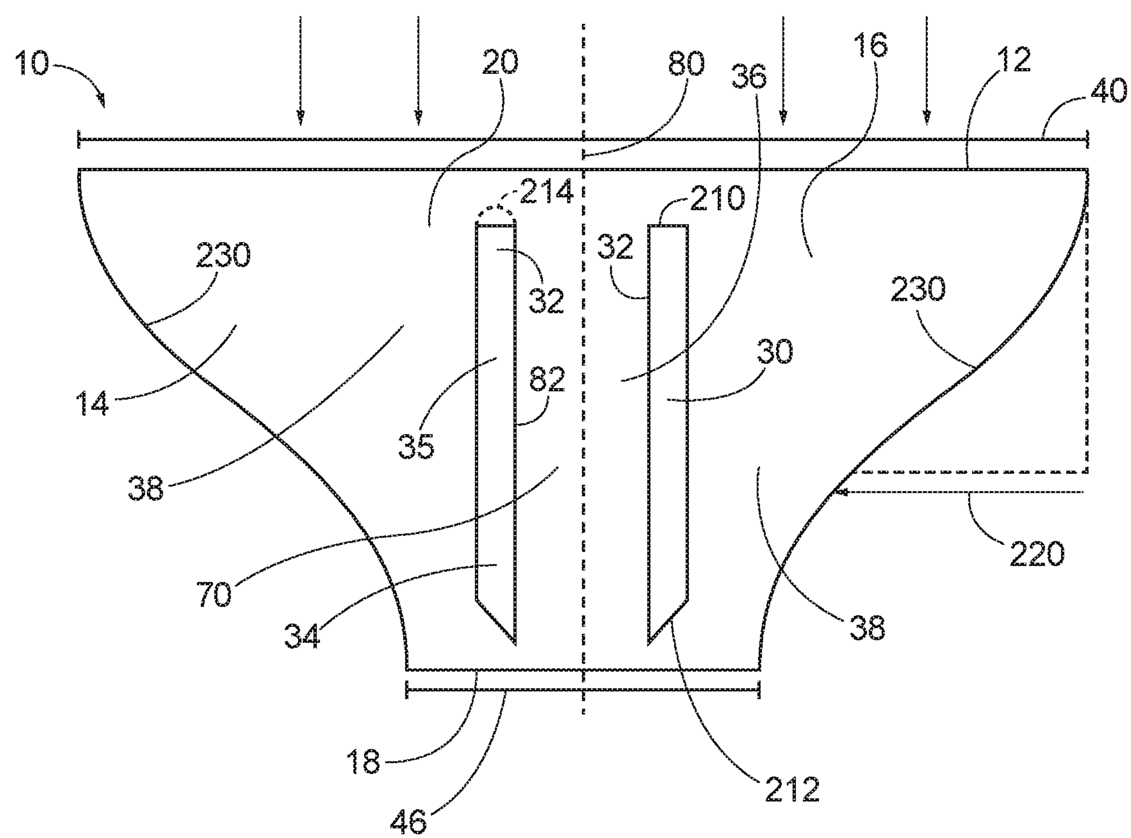
FIG. 2 is a schematic top down schematic diagram illustrating the performance of a diffuser inlet according to the present disclosure.

FIG. 2 is a schematic top down diagram illustrating an example of diffuser inlet 10 that includes a pair of elongate structures 30. FIG. 2 shows the pair of elongate structures 30 located on the internal surface 20 of the inlet diffuser 10. Each elongate structure 30 is shown as having the front end 32 proximate to the inlet aperture 12 and the rear end 34 downstream of the front end 32. In FIG. 2, the front ends 32 are shown as corresponding to flat ends 210, and the rear ends 34 are shown as corresponding to angled ends 212. However, in alternative embodiments, one or more of the front end 32 and the rear end 34 may correspond to a flat end 210, an angled end 212, and/or a curved end 214. In FIG. 2, a portion of internal surface 20 is shown as being disposed between the front end 32 of the elongate structures 30 and the inlet aperture 12. Alternatively, the front end 32 of a respective elongate structure 30 may be aligned with the inlet aperture 12.

FIG. 2 further illustrates an example of inlet diffuser 10, wherein centerline 80 bisects the internal surface 20 of the inlet diffuser 10. In some embodiments, each elongate structure 30 is equally spaced from the centerline 80. Additionally, FIG. 2 shows channel 70 located inboard of each of the elongate structures 30 through which boundary layer air is able to flow from the inlet aperture 12 downstream to the exit aperture 18 of the inlet diffuser 10. An inboard surface 82 of each elongate structure 30 may form barriers that prevent boundary layer air from flowing out of the channel 70 in an outboard direction. FIG. 2 shows channel 70 as having a constant width (i.e., the distance between the inboard surfaces 82 of the elongate structures 30 is constant along the length of the channel 70).

According to the present disclosure, the internal volume 16 of the inlet diffuser 10 may narrow in an inboard direction between the inlet aperture 12 and the exit aperture 18. This narrowing of the internal volume 16 is indicated in FIG. 2 by the number 220. As shown in FIG. 2, where the maximum width 40 of the inlet aperture 12 is greater than a maximum width 46 of the exit aperture 18, the internal volume 16 must narrow in an inboard direction to compensate for the difference. FIG. 2 depicts the diffuser body 14 as including one or more outboard walls 230 that face the internal volume 16. To compensate for a difference in maximum width 40 and maximum width 46, FIG. 2 depicts each outboard wall 230 of diffuser body 14 narrowing in an inboard direction. This narrowing of the outboard walls 230 of the internal volume 16 results in the second portions 38 of boundary layer air being forced to move in an inboard direction.

To account for this inboard movement of the second portion 38 of boundary layer air, each elongate structure 30 is configured to allow boundary layer air to flow in an inboard direction across the respective elongate structure 30. Additionally, each elongate structure 30 is also configured to push the second portion 38 of boundary layer air away from the internal surface 20 of the internal volume 16 as the second portion 38 of boundary layer air flows across the respective elongate structure 30 in an inboard direction. For example, each elongate structure 30 may push a corresponding second portion 38 of boundary layer air away from the internal surface 20 such that once the corresponding second portion 38 has fully crossed each elongate structure 30 in an inboard direction, the second portion 38 of boundary layer air is introduced to a region of the internal volume 16 that is inward of the channel 70. In this way, the second portions 38 of boundary layer air that are displaced by the narrowing of the outboard walls 230 mix with a portion of the high energy airflow disposed inward of the first portion 36 of boundary layer air. Therefore, instead of the first portion 36 of boundary layer air being compressed in an inboard direction and/or pushed away from the internal surface 20 by the inboard movement of the second portion 38 of boundary layer air, the elongate structures 30 of the present disclosure isolate the flow of the first portion 36 of boundary layer air within the channel 70 while introducing the inwardly displaced second portion 38 of boundary layer air into a sub volume of the internal volume 16 located inward of the channel 70.

Figure 3:
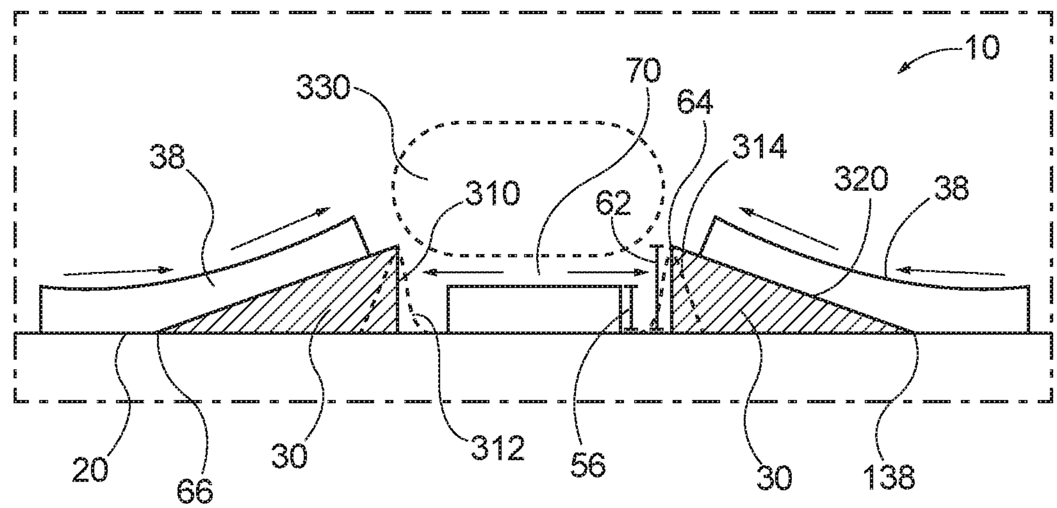
FIG. 3 is a schematic cross-sectional diagram representing examples of inlet diffusers according to the present disclosure.
Figure 4:
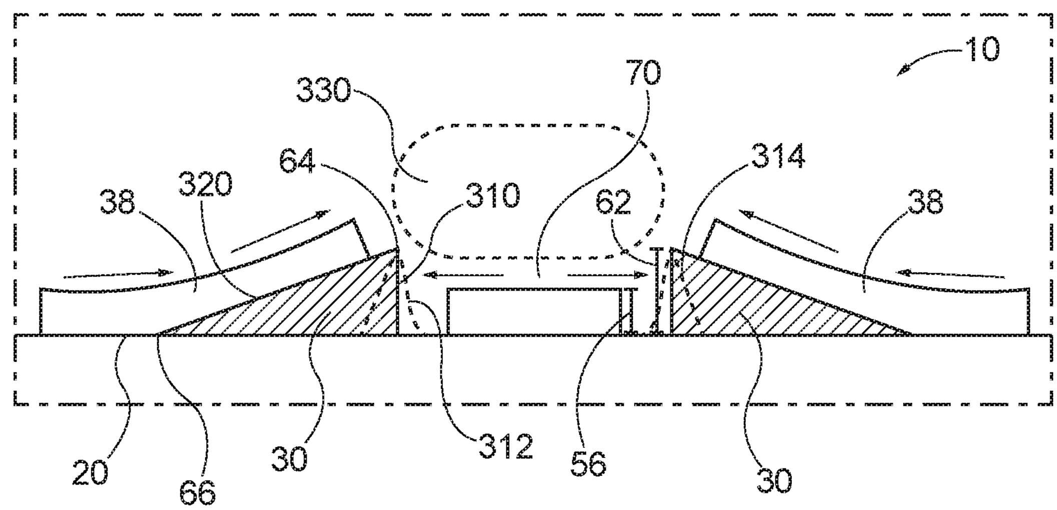
FIG. 4 is a schematic cross-sectional diagram representing examples of inlet diffusers according to the present disclosure.

FIGS. 3-4 are schematic cross-sectional diagrams illustrating examples of inlet diffusers 10 that include a pair of elongate structures 30. FIGS. 3-4 show the pair of elongate structures 30 located on the internal surface 20 of the inlet diffuser 10. Each elongate structure 30 includes a wall face 310 that extends substantially perpendicular to the internal surface 20 along an inboard side of the respective elongate structure 30. Within the present disclosure, substantially perpendicular corresponds to the wall face 310 being within 15° of perpendicular to the immediately adjacent inboard portion of the internal surface 20. Alternatively, in some embodiments the wall face 310 may have a curved slope face 312 or have an angular slope face 314 with relation to the internal surface 20 as schematically and optionally illustrated in FIGS. 3-4.

FIGS. 3 and 4 also show the wall faces 310 as having a perpendicular altitude 62 that corresponds to a perpendicular distance between the internal surface 20 and an apex portion 64 of the wall face 310. Within the present disclosure, the apex portion 64 of the wall face 310 may correspond to a region of an upper portion of the wall face 310, a point on the wall face 310, and/or an upper ridge of the wall face 310. In some embodiments, the altitude 62 of the wall face 310 is constant over the length of the elongate structures 30. Alternatively, the altitude 62 of the wall face 310 may vary over the length of the elongate structure 30. For example, in one embodiment, the perpendicular distance between the internal surface 20 and the apex portion 64 of the wall face 310 at the rear end 34 may be less than the perpendicular distance between the internal surface 20 and the apex portion 64 of the wall face 310 at a central portion of the elongate structure 30 between the front end 32 and the rear end 34.

FIGS. 3-4 further illustrate channel 70 formed between the pair of elongate structures 30 and first portion 36 of boundary layer air flowing within the channel 70 from the inlet aperture 12 toward the exit aperture 18 of the inlet diffuser 10. As shown in FIGS. 3-4, the wall face 310 of each elongate structure 30 may correspond to a corresponding elongate side of the channel 70. Each wall face 310 acts as a barrier that prevents boundary layer air from moving across the elongate structure 30 in an outboard direction. For example, when the first portion 36 of boundary layer air flows within the channel 70 toward the exit aperture 18, the wall faces 310 of the elongate structures 30 may obstruct the first portion 36 of boundary layer air from flowing out of the channel 70 in an outboard direction. In this way, the wall faces 310 act as a barrier that restricts the outboard flow of the first portion 36 of boundary layer air such that first portion 36 remains within the channel 70. In some embodiments, the altitude 62 of the wall face 310 at any given point along the elongate structure 30 is greater than an expected thickness 56 of the first portion 36 of boundary layer air as measured perpendicularly from the internal surface 20. For example, if the thickness 56 of the first boundary layer of air at a first point along the elongate structures 30 is expected to be 3 centimeters when the first portion 36 of boundary layer air flows within the channel 70 at normal operating velocities, then the altitude 62 of the wall face 310 at the first point along the elongate structure 30 may be 4 centimeters.

FIGS. 3-4 also illustrate each elongate structure 30 as including a ramp face 320 that extends from the apex portion 64 of the wall face 310 of each elongate structure 30 to an outboard location 66 of the internal surface 20, and extends along a length of each elongate structure 30. According to the present disclosure, the ramp face 320 is configured to allow boundary layer air to flow across the surface of the ramp face 320 in an inboard direction.

As an example, FIGS. 3-4 show multiple second portions 38 of boundary layer air as flowing in an inboard direction across the ramp face 320. Additionally, as the boundary layer air flows across the ramp face 320 of the elongate structure 30, the boundary layer air is pushed away from the internal surface 20. For example, FIGS. 3-4 shows the second portions 38 of boundary layer air flowing across the ramp faces 320 in an inboard direction such that a perpendicular distance between the internal surface 20 and a second portion 38 of boundary layer air increases as each second portion 38 of boundary layer air flows in an inboard direction across a corresponding ramp face 320.

The surface of the ramp face 320 may be configured to allow a boundary layer air to smoothly flow across ramp face 320. For example, FIG. 3 shows an embodiment of the inlet diffuser for a jet engine where the ramp face 320 is a straight ramp face 320 (i.e., whose cross-section is linear). Alternatively, FIG. 4 shows an alternative embodiment of inlet diffuser 10 where the ramp face 320 has a curved portion (i.e., whose cross-section is concave) that more gradually pushes the boundary layer air away from the internal surface 20. The characteristics of the ramp face 320 (i.e., slope, curvature, length, etc.) may be constant along the length of elongate structure 30. Alternatively or in addition, one or more of the characteristics may vary along the length of elongate structure 30. For example, the ramp face 320 may have a first concave curvature in a first perpendicular cross section of a respective elongate structure 30, and a second concave curvature in a second perpendicular cross section of the respective elongate structure 30. In this way, the pair of elongate structures 30 may be able to account for the different flow characteristics present at different regions of the inlet diffuser 10 (e.g., based on the curvature of outboard walls 230, a size, shape, and/or offset of the inlet aperture 12 and/or exit aperture 18, characteristics of aircraft 100, characteristics of engine 130, etc.).

FIGS. 3-4 also show a central sub volume 330 of the internal volume 16 through which high energy airflow flows. When the a portion of boundary layer air that is flowing inboard reaches the inboard end of the ramp face 320, the portion of boundary layer air is allowed to flow into the central sub volume 330. In this way, instead of displacing the first portion 36 of boundary layer air as first portion 36 flows within the channel 70, the ramp faces 320 of the elongate structures 30 cause the second portions 38 of boundary layer air to flow into a region of the internal volume 16 inward of the channel 70. Once the second portions 38 of boundary layer air flow into the central sub volume 330, the second portion 38 of boundary layer air mixes with the high energy airflow to form a less distorted flow that remains close to the internal surface 20.

Turning now to FIGS. 5-7, illustrative non-exclusive examples of inlet diffusers 10 for jet engines are illustrated. Where appropriate, the reference numerals from the schematic illustrations of FIGS. 1-4 are used to designate corresponding parts of the examples of FIGS. 5-7; however, the examples of FIGS. 5-7 are non-exclusive and do not limit inlet diffusers for jet engines to the illustrated embodiments of FIGS. 5-7. That is, inlet diffusers for jet engines according to the present disclosure are not limited to the specific embodiments of 5-7, and inlet diffusers for jet engines according to the present disclosure may incorporate any number of the various aspects, configurations, characteristics, properties, etc. of inlet diffusers for jet engines that are illustrated in and discussed with reference to the schematic representations of FIGS. 1-4 and/or the embodiments of FIGS. 5-7, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the examples of FIGS. 5-7; however, it is within the scope of the present disclosure that the previously discussed features, variants, etc. may be utilized with the examples of FIGS. 5-7.

As seen in FIG. 5, an inlet diffuser 500 is an example of inlet diffuser 10 for jet engine 130 that includes a pair of elongate structures 30 starting at or near the inlet aperture 12 and having straight ramp faces 320. Inlet diffuser 500 includes a diffuser body 14 that defines an internal volume 16, an inlet aperture 12 by which ambient air enters an internal volume 16, and an exit aperture 18 by which air passes from the internal volume 16 of the inlet diffuser 500 to a downstream portion of a jet engine 130 that is operatively engaged with the exit aperture 18.

The inlet diffuser 500 includes the pair of elongate structures 30 extending longitudinally along an internal surface 20 of the diffuser body 14 that faces the internal volume 16. Each of the pair of elongate structures 30 includes a front end 32 that is located on a fore region 22 and a rear end 34 that is located on an aft region 24. In FIG. 5, the front end 32 is illustrated as extending to the inlet aperture 12. The front end 32 may include a blunt face 502 that splits the boundary layer air into multiple portions. Alternatively or in addition, the front end 32 may have a gradual increase 512 in altitude so as to split the boundary layer air while reducing a size of a bow wave created by an interaction between the ambient air entering the inlet aperture 12 and the front end 32. FIG. 5 also shows the rear end 34 extending to a region upstream of exit aperture 18, and exhibiting a gradual decrease in altitude so as to reduce a wake coming off the rear end 34.

FIG. 5 also shows perpendicular cross sections 510-540 that show the operation of the inlet diffuser 500 at different locations within the inlet diffuser 500. For example, cross section 510 illustrates the operation of the inlet diffuser 500 at a location near the inlet aperture 12. Cross section 510 shows the pair of elongate structures 30 that include inboard wall faces 310 that define the outboard boundaries of a channel 70, and outboard ramp faces 320 that have a straight slope. In cross section 510, it is seen how the elongate structures 30 split the incoming boundary layer air into a first portion 36 of boundary layer air that is located within channel 70 and second portions 38 of boundary layer air that are located outboard of the elongate structures 30.

Cross section 520 illustrates the operation of the inlet diffuser 500 at a location downstream of the inlet aperture 12 where the internal volume 16 has begun to narrow. Cross section 520 shows the pair of elongate structures 30, and the first portion 36 of boundary layer air flowing within the channel 70. Cross section 520 illustrates the narrowing of the inlet diffuser 500 causing the second portions 38 of boundary layer air to move in an inboard direction along the internal surface 20. Cross section 520 also shows the second portion 38 of boundary layer air moving across the straight ramp face 320 of the elongate structures 30 and being pushed away from the internal surface 20 and towards central sub volume 330 of the internal volume 16 and inward of the channel 70, through which high energy airflow flows.

Cross section 530 illustrates the operation of the inlet diffuser 500 at a location downstream of cross section 520, where the internal volume 16 has continued to narrow. Cross section 530 shows the pair of elongate structures 30, and the first portion 36 of boundary layer air flowing within the channel 70. Cross section 530 illustrates how the continued narrowing of the inlet diffuser 500 has caused the second portions 38 of boundary layer air to move in an inboard direction across the elongate structures 30 and into the central sub volume 330 of the internal volume 16 through which high energy airflow flows. Cross section 530 also shows the mixing of the second portions 38 of boundary layer air with the high energy airflow and/or the first portion 36 of boundary layer air.

Cross section 540 illustrates the operation of the inlet diffuser 500 at a location proximate to the exit aperture 18. Cross section 540 shows the first portion 36 of boundary layer air and the second portions 38 of boundary layer air mixing with each other, as well as the high energy airflow that flows within a central portion of the internal volume 16. As can be seen, the elongate structures 30 facilitate the gradual mixing of the boundary layer air along their length, minimizing vortexes and/or pressure distortion created by such mixing and/or localizing the vortexes and/or pressure distortion to regions proximate to the internal surface 20.

As seen in FIG. 6, an inlet diffuser 600 is an example of inlet diffuser 10 for a jet engine 130 that includes a pair of elongate structures 30 starting at a location removed from the inlet aperture 12 and having curved ramp faces 320. Inlet diffuser 600 includes a diffuser body 14 that defines an internal volume 16, an inlet aperture 12 by which ambient air enters the internal volume 16, and an exit aperture 18 by which air passes from the internal volume 16 of the inlet diffuser 10 to a downstream portion of a jet engine 130 that is operatively engaged with the exit aperture 18.

The inlet diffuser 600 also includes the pair of elongate structures 30 extending longitudinally along an internal surface 20 of the diffuser body 14 that faces the internal volume 16. Each of the pair of elongate structures 30 includes a front end 32 that is located on a fore region 22 and a rear end 34 that is located on an aft region 24. In FIG. 6, the front end 32 is illustrated as being removed from the inlet aperture 12. The front end 32 is also illustrated in FIG. 6 as having a gradual increase 612 in altitude that splits the boundary layer air while reducing a size of a bow wave created by an interaction between the ambient air entering the inlet aperture 12 and the front end 32. FIG. 6 also shows the rear end 34 extending to a region upstream of exit aperture 18, and exhibiting a gradual decrease in altitude so as to reduce a wake coming off the rear end 34.

FIG. 6 also shows perpendicular cross sections 610-640 that show the operation of the inlet diffuser 600 at different locations within the inlet diffuser 600. For example, cross section 610 illustrates the operation of the inlet diffuser 600 at a location near the inlet aperture 12. Cross section 610 shows a boundary layer of air that has formed on the internal surface 20.

Cross section 620 illustrates the operation of the inlet diffuser 600 at a location downstream of the inlet aperture 12 where the internal volume 16 has begun to narrow. Cross section 620 shows the pair of elongate structures 30 that include inboard wall faces 310 that define the outboard boundaries of a channel 70, and outboard ramp faces 320 that have a curved slope. In cross section 620, it is seen how the elongate structures 30 split the incoming boundary layer air into a first portion 36 of boundary layer air that is located within channel 70 and second portions 38 of boundary layer air that are located outboard of the elongate structures 30. Cross section 620 also illustrates the narrowing of the inlet diffuser 600 causing the second portions 38 of boundary layer air to move in an inboard direction across the curved slope of the outboard ramp faces 320 of the elongate structures 30 and being pushed away from the internal surface 20 and towards central sub volume 330 of the internal volume 16 and inward of the channel 70, through which high energy airflow flows.

Cross section 630 illustrates the operation of the inlet diffuser 600 at a location downstream of cross section 620, where the internal volume 16 has continued to narrow. Cross section 630 shows the pair of elongate structures 30, and the first portion 36 of boundary layer air flowing within the channel 70. Cross section 630 illustrates how the continued narrowing of the inlet diffuser 600 has caused the second portions 38 of boundary layer air to move in an inboard direction across the curved slope of the outboard ramp faces 320 of the elongate structures 30 and into the central sub volume 330 of the internal volume 16 through which high energy airflow flows. Cross section 630 also shows the mixing of the second portions 38 of boundary layer air with the high energy airflow and/or the first portion 36 of boundary layer air.

Cross section 640 illustrates the operation of the inlet diffuser 600 at a location proximate to the exit aperture 18. Cross section 640 shows the first portion 36 of boundary layer air and the second portions 38 of boundary layer air mixing with each other, as well as the high energy airflow that flows within a central portion of the internal volume 16. As can be seen, the elongate structures 30 facilitate the gradual mixing of the boundary layer air along their length, minimizing vortexes and/or pressure distortion created by such mixing and/or localizing the vortexes and/or pressure distortion to regions proximate to the internal surface 20.

As seen in FIG. 7, an inlet diffuser 700 is an example of inlet diffuser 10 for a jet engine 130 that includes multiple pairs of elongate structures 30. Inlet diffuser 700 includes a diffuser body 14 that defines an internal volume 16, an inlet aperture 12 by which ambient air enters the internal volume 16, and an exit aperture 18 by which air passes from the internal volume 16 of the inlet diffuser 700. Inlet diffuser 700 also includes an inner pair 712 of elongate structures 30 and an outer pair 714 of elongate structures 30. Inner pair 712 and outer pair 714 of elongate structures 30 extend longitudinally along an internal surface 20 of the diffuser body 14 that faces the internal volume 16.

FIG. 7 also shows perpendicular cross sections 710-740 that show the operation of the inlet diffuser 700 at different locations within the inlet diffuser 700. For example, cross section 710 illustrates the operation of the inlet diffuser 700 at a location near the inlet aperture 12. Cross section 710 shows inner pair 712 of elongate structures 30 and outer pair 714 of elongate structures 30. Each of the elongate structures 30 includes inboard wall faces 310 and outboard ramp faces 320 that have a straight slope. The wall faces 310 of the inner pair 712 of elongate structures 30 define the outboard boundaries of a channel 70. In cross section 710, it is seen how the elongate structures 30 split the incoming boundary layer air into a first portion 36 of boundary layer air that is located within channel 70 and multiple second portions 38 of boundary layer air that are located outboard of the inner pair 712 of elongate structures 30.

Cross section 720 illustrates the operation of the inlet diffuser 700 at a location downstream of the inlet aperture 12 where the internal volume 16 has begun to narrow. Cross section 720 shows the multiple pairs of elongate structures 30, and the first portion 36 of boundary layer air flowing within the channel 70. Cross section 720 illustrates the narrowing of the inlet diffuser 700 causing the second portions 38 of boundary layer air to move in an inboard direction along the internal surface 20. Cross section 720 also shows the second portion 38 of boundary layer air moving across the straight ramp faces 320 of each of the elongate structures 30 and being pushed away from the internal surface 20.

In example inlet diffuser 700, the outer pair 714 of elongate structures 30 does not extend a length 60 of the inlet diffuser 700. Cross section 730 illustrates a location downstream of cross section 720 after the outer pair 714 of elongate structures 30 has ended, and where the internal volume 16 has continued to narrow. Cross section 730 shows the inner pair 712 of elongate structures 30, and the first portion 36 of boundary layer air flowing within the channel 70. Cross section 730 illustrates how the continued narrowing of the inlet diffuser 700 has caused the second portions 38 of boundary layer air to move in an inboard direction across the elongate structures 30 and into a central sub volume 330 of the internal volume 16 through which high energy airflow flows. Cross section 730 also shows the mixing of the second portions 38 of boundary layer air with the high energy airflow and/or the first portion 36 of boundary layer air.

Cross section 740 illustrates the operation of the inlet diffuser 700 at a location proximate to the exit aperture 18. Cross section 740 shows the first portion 36 of boundary layer air and the second portions 38 of boundary layer air mixing with each other, as well as the high energy airflow that flows within a central portion of the internal volume 16. As can be seen, the elongate structures 30 facilitate the gradual mixing of the boundary layer air along their length, minimizing vortexes and/or pressure distortion created by such mixing and/or localizing the vortexes and/or pressure distortion to regions proximate to the internal surface 20.

Figure 8:
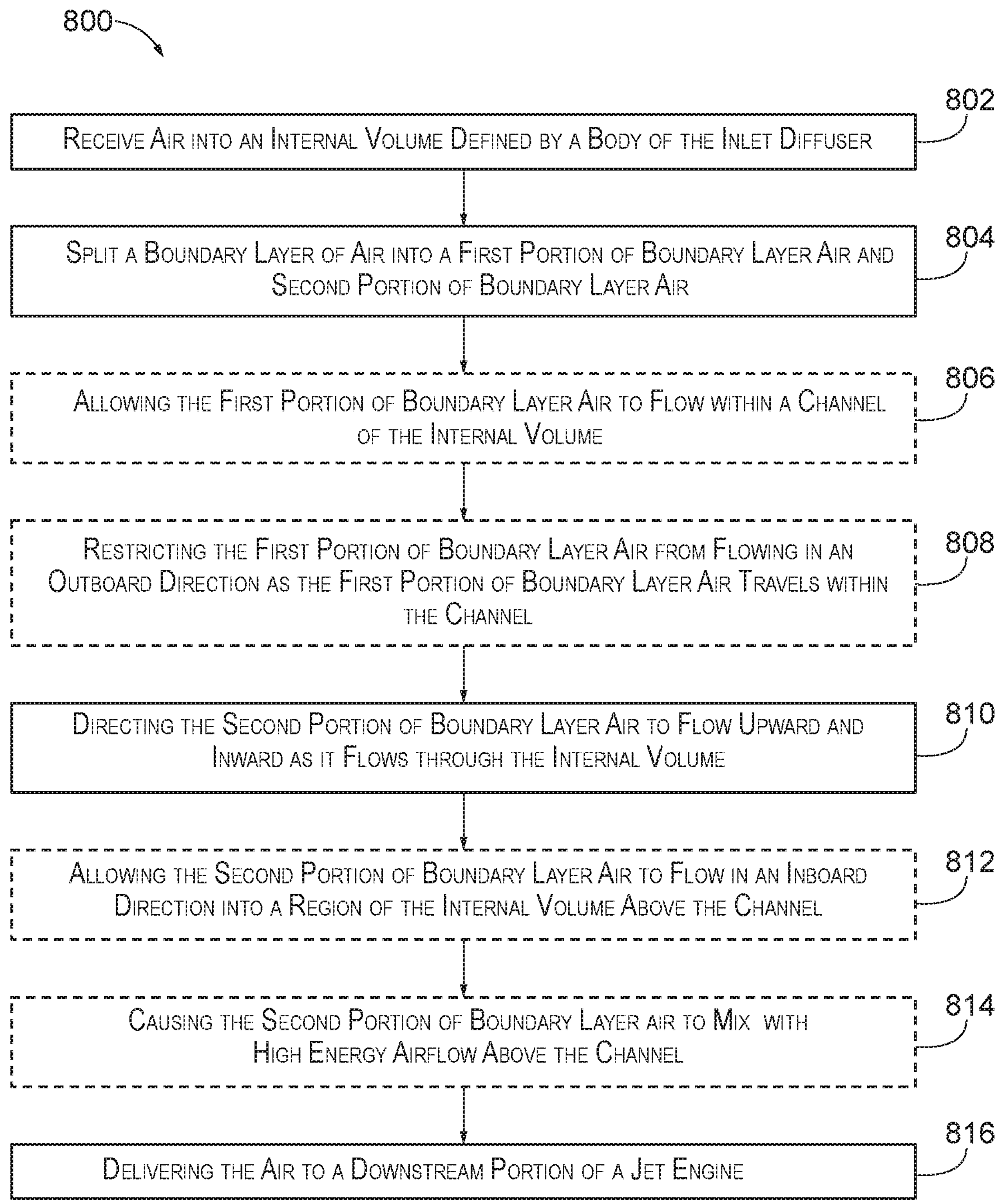
FIG. 8 is a flowchart depicting methods of diffusing incoming air according to the present disclosure.

FIG. 8 schematically provides a flowchart that represents illustrative, non-exclusive examples of methods according to the present disclosure. In FIG. 8, some steps are illustrated in dashed boxes indicating that such steps may be optional or may correspond to an optional version of a method according to the present disclosure. That said, not all methods according to the present disclosure are required to include the steps illustrated in solid boxes. Additionally, the order of steps illustrated in FIG. 8 is exemplary, and in different embodiments the steps in FIG. 8 may be performed in a different order. The methods and steps illustrated in FIG. 8 are not limiting and other methods and steps are within the scope of the present disclosure, including methods having greater than or fewer than the number of steps illustrated, as understood from the discussions herein.

FIG. 8 is a flowchart depicting methods 800, according to the present disclosure, of mixing boundary layer air in an inlet diffuser of a jet engine. Methods 800 include receiving air into an internal volume (e.g., internal volume 16) defined by a body (e.g., diffuser body 14) of the inlet diffuser at 802. For example, the air may correspond to ambient air outside of the inlet diffuser that flows into the internal volume via an inlet aperture (e.g., inlet aperture 12). According to the present disclosure, the inlet aperture may have a high aspect ratio.

Methods 800 also include splitting a boundary layer of the air into a first portion (e.g. first portion 36) of boundary layer air and second portions (e.g., second portions 38) of boundary layer air. The splitting at 804 may include the boundary layer of the air being split by one or more pairs of elongate structures (e.g., elongate structures 30) located on an internal surface (e.g., internal surface 20) facing the internal volume proximate to the boundary layer air. In some examples, the first portion of boundary layer air is located between the second portions of boundary layer air.

Methods 800 optionally may include allowing at 806 the first portion of boundary layer air to flow within a channel (e.g., channel 70) of the internal volume that is formed by a pair of elongate structures at 806. For example, the channel may be formed on opposing sides by wall faces (e.g., wall faces 310) of the pair of elongate structures. Methods 800 also optionally may include restricting the first portion of boundary layer air in 808 to prevent the first portion of boundary layer air from flowing in an outboard direction as the first portion of boundary layer air travels within the channel. For example, each of the wall faces of the pair of elongate structures may prevent the first portion of boundary layer air from flowing across the corresponding elongate structures.

Methods 800 also includes directing the second portions of boundary layer air to flow upward and inward as the second portions flow through the internal volume towards an exit (e.g., exit aperture 18) of the inlet diffuser at 810. The directing at 810 may include directing the second portions of boundary layer air to flow in an inward direction across ramp faces (e.g., ramp faces 320) of the elongate structures. The ramp faces may be sloped so that, as the second portions of boundary layer air move across the ramp faces in an inward direction, the second portions of boundary layer air are pushed inward of the internal surface and toward a central region of the internal volume. Methods 800 optionally may include allowing the second portions of boundary layer air to flow in an inboard direction at 812. This may correspond to allowing the second portions of boundary layer air to flow into a region of the internal volume inward of the channel through which a high energy airflow flows through the internal volume. For example, the ramp faces may be sloped such that, once the second portions of boundary layer air have moved across the ramp faces in an inward direction, the second portions of boundary layer air continue to move in an inboard direction into a central sub volume (e.g., central sub volume 330) of the internal volume through which high energy airflow flows. In this way, instead of displacing the first portion of boundary layer air into a central region of the internal volume, the second portions of boundary layer air that move in an inboard direction instead slide into a region inward of the first portion of boundary layer air.

Methods 800 optionally also may include causing the second portions of boundary layer air to mix at 814. The mixing at 814 may include allowing the second portions of boundary layer air to mix with a high energy airflow inward of the channel in the central sub volume of the internal volume through which high energy airflow flows. The mixing at 814 may occur gradually along the length of the elongate structures as the second portions of boundary layer air flow through the internal volume towards the exit of the inlet diffuser.

Methods 800 also include delivering the air to a downstream portion of the jet engine at 816, which may occur via an exit interface of the inlet diffuser that is operationally connected to the jet engine.

Illustrative, non-exclusive examples of inventive subject matter according to the present disclosure are described in the following enumerated paragraphs:

A1. An inlet diffuser for a jet engine, the inlet diffuser comprising:

a diffuser body defining an internal volume and having an inlet to the internal volume for receiving incoming ambient air and an exit to the internal volume for delivering the air to a downstream portion of the jet engine, wherein the diffuser body has an internal surface facing the internal volume, the internal surface comprising a fore region proximate to the inlet and an aft region downstream of the fore region and proximate to the exit, and a pair of elongate structures extending longitudinally along the internal surface from the fore region of the internal surface to the aft region of the internal surface, wherein the pair of elongate structures defines a channel of the internal volume inboard of the elongate structures.

A1.1. The inlet diffuser of paragraph A1, wherein the pair of elongate structures is configured to allow a first portion of boundary layer air located between the elongate structures to flow within the channel from the fore region to the aft region, and restrict the first portion of boundary layer air from flowing across the elongate structures.

A1.2. The inlet diffuser of any of paragraphs A1-A1.1, wherein the pair of elongate structures is configured to allow a second portion of boundary layer air located outboard of the elongate structures relative to the channel to flow across the elongate structures and into a region of the internal volume inward of the channel, and push the second portion of boundary layer air away from the internal surface of the internal volume as the second portion of boundary layer air flows across the elongate structure.

A1.3. The inlet diffuser of any of paragraphs A1-A1.2, wherein the pair of elongate structures is configured to cause the second portion of boundary layer air to mix with a high energy airflow inward of the channel as the second portion of boundary layer air flows from the fore region to the aft region.

A1.4. The inlet diffuser of paragraph A1.3, wherein each elongate structure of the pair of elongate structures is configured to cause the second portion of boundary layer air to gradually mix with the high energy airflow inward of the channel along the longitudinal length of the corresponding elongate structure.

A1.5. The inlet diffuser of any of paragraphs A1-A1.4, wherein the pair of elongate structures is configured to cause a low pressure region created during a mixing of the first portion of boundary layer air, the second portion of boundary layer air, and the high energy airflow to remain close to the internal surface of the inlet diffuser.

A1.6. The inlet diffuser of paragraph A1.5, wherein remaining close to the internal surface corresponds to the low pressure region remaining within a distance that is 20% of a maximum height of the exit to the internal volume.

A1.7. The inlet diffuser of any of paragraphs A1-A1.6, wherein a shape of the internal volume of the inlet diffuser causes the second portion of the boundary layer air to move in an inboard direction as the second portion of the boundary layer air flows from the fore region to the aft region.

A2. The inlet diffuser of any of paragraphs A1-A1.7, wherein the inlet has a maximum width and a maximum height and wherein the maximum width of the inlet is at least 2, at least 3, at least 4, or at least 5 times the maximum height of the inlet.

A3. The inlet diffuser of any of paragraphs A1-A2, wherein a normal extending from a center point of a perpendicular cross section of the inlet is offset from a normal extending from a center point of a perpendicular cross section of the exit.

A3.1. The inlet diffuser of any of paragraphs A1-A3, wherein a front end of each elongate structure is configured to split incoming boundary layer air into the first portion of boundary layer air and the second portion of boundary layer air.

A4. The inlet diffuser of any of paragraphs A1-A3.1, wherein each elongate structure of the elongate structures comprises a wall face extending substantially perpendicular to the internal surface of the inlet diffuser and extending a length of the respective elongate structure, wherein the wall face is an inboard surface of the respective elongate structure and is configured to restrict the first portion of boundary layer air from flowing across the respective elongate structure.

A4.1. The inlet diffuser of paragraph A4, wherein a perpendicular distance between the internal surface and an apex portion of the wall face varies over the length of the elongate structure.

A4.2. The inlet diffuser of any of paragraphs A4-A4.1, wherein the perpendicular distance between the internal surface and the apex portion of the wall face is greater than an expected thickness of the first portion of boundary layer air in a channel region proximate to the apex portion of the wall when the first portion of boundary layer air flows within the channel at normal operating velocities.

A4.3. The inlet diffuser of any of paragraphs A4-A4.2, wherein each elongate structure includes a rear end downstream of the front end.

A4.4. The inlet diffuser of any of paragraphs A4-A4.3, wherein the perpendicular distance between the internal surface and the apex portion of the wall face at the front end is less than the perpendicular distance between the internal surface and the apex portion of the wall face at a central portion of the elongate structure between the front end and the rear end.

A4.5. The inlet diffuser of any of paragraphs A4.3-A4.4, wherein the perpendicular distance between the internal surface and the apex portion of the wall face at the front end approaches zero.

A4.6. The inlet diffuser of any of paragraphs A4.3-A4.5, wherein the perpendicular distance between the internal surface and the apex portion of the wall face at the rear end is less than the perpendicular distance between the internal surface and the apex portion of the wall face at the central portion of the elongate structure between the front end and the rear end.

A4.7. The inlet diffuser of any of paragraphs A4.3-A4.6, wherein the perpendicular distance between the internal surface and the apex portion of the wall face at the rear end approaches zero.

A5. The inlet diffuser of any of paragraphs A4-A4.7, wherein the apex portion of the wall face is opposite the internal surface and wherein each elongate structure comprises a ramp face that (i) extends from the apex portion of the wall face to a portion of the internal surface of the inlet diffuser that is outboard of the respective elongate structure, and (ii) extends the length of the respective elongate structure.

A5.1. The inlet diffuser of paragraph A5, wherein the ramp face is configured to (i) allow the second portion of boundary layer air located outboard of the respective elongate structure to flow across the ramp face and into the region of the internal volume inward of the channel, and (ii) push the second portion of boundary layer air away from the internal surface of the internal volume as the second portion of boundary layer air flows across the ramp face.

A5.2. The inlet diffuser of paragraph A5.1, wherein the ramp face is configured to cause the second portion of boundary layer air to mix with the high energy airflow inward of the channel.

A5.3. The inlet diffuser of paragraph A5.2, wherein the ramp face is configured to cause the low pressure region created during the mixing of the first portion of boundary layer air, the second portion of boundary layer air, and the high energy airflow to remain close to the internal surface of the inlet diffuser.

A5.4. The inlet diffuser of paragraph A5.3, wherein remaining close to the internal surface corresponds to the low pressure region remaining within the distance that is 20% of the maximum height of the exit to the internal volume.

A5.5. The inlet diffuser of any of paragraphs A5-A5.4, wherein in a perpendicular cross section of each elongate structure, the ramp face is straight.

A5.6. The inlet diffuser of any of paragraphs A5-A5.5, wherein in the perpendicular cross section of each elongate structure, the ramp face is concave.

A5.7. The inlet diffuser of paragraph A5.6, wherein in a first perpendicular cross section of each elongate structure, the ramp face has a first concave curvature, and in a second perpendicular cross section of the respective elongate structure, the ramp face has a second concave curvature.

A6. The inlet diffuser of any of paragraphs A1-A5.7, wherein the channel is a constant width.

A7. The inlet diffuser of any of paragraphs A2-A6, wherein the exit has a maximum width and where a ratio of the maximum width of the exit to the maximum height of the exit is less than a ratio of the maximum width of the inlet and the maximum height of the inlet.

A8. The inlet diffuser of any of paragraphs A1-A7, wherein the exit has a circular shape.

A9. The inlet diffuser of any of paragraphs A1-A8, wherein a shape of the exit corresponds to a shape of a downstream component of the jet engine.

A10. The inlet diffuser of any of paragraphs A7-A9, wherein the maximum width of the inlet is greater than the maximum width of the exit, and wherein a width of the internal volume of the inlet diffuser narrows over a length of the inlet diffuser.

A11. The inlet diffuser of any of paragraphs A7-A10, wherein the maximum height of the inlet is less than the maximum height of the exit.

A12. The inlet diffuser of any of paragraphs A1-A11, wherein the internal surface includes an offset sloped surface.

A13. The inlet diffuser of paragraph A12, wherein the offset sloped surface is configured to reduce a velocity of air within the internal volume of the inlet diffuser.

A14. The inlet diffuser of any of paragraphs A12-A13, wherein the internal surface includes an inlet surface region proximate to the inlet, and the offset sloped surface is located downstream of the inlet surface region.

A15. The inlet diffuser of any of paragraphs A12-A14, wherein the internal surface includes an exit surface portion proximate the exit, and the offset sloped surface is located upstream of the exit surface portion.

A16. The inlet diffuser of any of paragraphs A12-A15, wherein elongate structures are included on the offset sloped surface.

A17. The inlet diffuser of any of paragraphs A12-A16, wherein the fore end of each elongate structure is included on the offset sloped surface.

A18. The inlet diffuser of any of paragraphs A14-A16, wherein the front end of each elongate structure is included on the inlet surface region proximate to the inlet.

A19. The inlet diffuser of any of paragraphs A1-A18, wherein a width of each elongate structure changes over a length of the respective elongate structure.

A20. The inlet diffuser of any of paragraphs A1-A19, wherein the pair of elongate structures is a first pair of elongate structures, and the inlet diffuser further comprises a second pair of elongate structures.

A21. The inlet diffuser of paragraph A20, wherein the first pair of elongate structures is located inboard of the second pair of elongate structures.

A22. The inlet diffuser of any of paragraphs A20-A21, wherein a length of the second pair of elongate structures is shorter than a length of the first pair of elongate structures.

A23. The inlet diffuser of any of paragraphs A20-A22, wherein the internal surface of the internal volume includes a centerline that extends from the inlet of the internal volume to the exit of the internal volume, and the elongate structures of the first pair of elongate structures are equally spaced from the centerline.

A24. The inlet diffuser of any of paragraphs A1-A23, wherein the elongate structures are composed of a same material as the internal surface of the internal volume.

A25. The inlet diffuser of any of paragraphs A1-A24, wherein the elongate structures are coupled onto the internal surface of the internal volume.

A26. The inlet diffuser of any of paragraphs A1-A25, wherein the elongate structures are integrally formed with the internal surface of the internal volume.

A27. The inlet diffuser of any of paragraphs A1-A26, wherein the jet engine provides thrust for a jet aircraft.

A28. The inlet diffuser of paragraph A27, wherein the jet aircraft is a supersonic jet aircraft.

A29. The inlet diffuser of paragraph A28, wherein the jet aircraft is a subsonic jet aircraft.

A30. The inlet diffuser of paragraph A1-A29, wherein the inlet diffuser is configured to perform the method of any of paragraphs F1-F6.

B1. A combination of the inlet diffuser of any of paragraphs A1-A30 and a jet engine.

C1. A jet engine comprising:

an engine body; and the inlet diffuser of any of paragraphs A1-A30 operationally coupled to the engine body.

D1. A jet aircraft comprising:

a fuselage; and at least one jet engine operatively coupled to the fuselage and comprising the inlet diffuser of any of paragraphs A1-A30.

E1. The use of the inlet diffuser of any of paragraphs A1-A30 to diffuse incoming air of a jet engine.

F1. A method of diffusing incoming air of a jet engine, the method comprising:

receiving air into an internal volume defined by a body of an inlet diffuser;

splitting a lower boundary layer of the air into a first portion of boundary layer air and second portion of boundary layer air, wherein the first portion of boundary layer air is located between the second portion of boundary layer air;

directing the second portion of boundary layer air to flow upward and inward as the second portion of boundary layer air flows through the internal volume towards an exit of the inlet diffuser; and delivering, via the exit of the internal volume, the air to a downstream portion of the jet engine.

F2. The method of paragraph F1, further comprising allowing the first portion of boundary layer air to flow within a channel of the internal volume.

F3. The method of any of paragraphs F1-F2, wherein directing the second portion of boundary layer air to flow upward and inward comprises allowing the second portion of boundary layer air to flow in an inboard direction into a region of the internal volume inward of the channel, and causing the second portion of boundary layer air to mix with a high energy airflow inward of the channel as the second portion of boundary layer air flows through the internal volume towards the exit of the inlet diffuser.

F4. The method of any of paragraphs F1-F3, further comprising restricting the first portion of boundary layer air from flowing in an outboard direction as the first portion of boundary layer air travels within the channel.

F5. The method of any of paragraphs F1-F4, further comprising causing the second portion of boundary layer air to travel in the inboard direction as the second portion of boundary layer air flows through the internal volume towards the exit of the inlet diffuser.

F6. The method of any of paragraphs F1-F5, performed by the inlet diffuser of any of paragraphs A1-A30.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in inlet diffusers and/or methods that are not expressly disclosed herein.

The invention claimed is:

1. An inlet diffuser for a jet engine, the inlet diffuser comprising:

a diffuser body defining an internal volume and having an inlet to the internal volume for receiving incoming ambient air and an exit from the internal volume for delivering the air to a downstream portion of the jet engine, wherein the diffuser body has an internal surface facing the internal volume, the internal surface comprising a fore region proximate to the inlet and an aft region downstream of the fore region and proximate to the exit, and a pair of elongate structures extending longitudinally along the internal surface from the fore region of the internal surface to the aft region of the internal surface, wherein the pair of elongate structures defines a channel of the internal volume inboard of the elongate structures;

wherein a respective elongate structure of the pair of elongate structures comprises a wall face extending substantially perpendicular to the internal surface of the inlet diffuser and extending along a longitudinal length of the respective elongate structure, wherein the wall face is an inboard surface of the respective elongate structure and is configured to restrict a first portion of boundary layer air from flowing across the respective elongate structure, wherein the wall face comprises an apex portion opposite the internal surface, and wherein the respective elongate structure of the pair of elongate structures further comprises a ramp face that (i) extends from the apex portion of the wall face to a portion of the internal surface of the inlet diffuser that is outboard of the respective elongate structure, and (ii) extends along a longitudinal length of the respective elongate structure.

2. The inlet diffuser of claim 1, wherein the pair of elongate structures is configured to:

allow the first portion of boundary layer air located between the elongate structures to flow within the channel from the fore region to the aft region, and restrict the first portion of boundary layer air from flowing across the elongate structures.

3. The inlet diffuser of claim 1, wherein the pair of elongate structures is configured to:

allow a second portion of boundary layer air located outboard of the elongate structures relative to the channel to flow across the elongate structures and into a region of the internal volume inward of the channel, and push the second portion of boundary layer air away from the internal surface of the internal volume as the second portion of boundary layer air flows across the elongate structures.

4. The inlet diffuser of claim 3, wherein the pair of elongate structures is configured to cause the second portion of boundary layer air to mix with a high energy airflow inward of the channel as the second portion of boundary layer air flows from the fore region to the aft region.

5. The inlet diffuser of claim 4, wherein the pair of elongate structures is configured to cause a low pressure region created during a mixing of the first portion of boundary layer air, the second portion of boundary layer air, and the high energy airflow to remain close to the internal surface of the inlet diffuser.

6. The inlet diffuser of claim 4, wherein the elongate structures are each configured to cause the second portion of boundary layer air to gradually mix with the high energy airflow inward of the channel along a longitudinal length of the elongate structures.

7. The inlet diffuser of claim 3, wherein a shape of the internal volume of the inlet diffuser causes the second portion of boundary layer air to move in an inboard direction as the second portion of boundary layer air flows from the fore region to the aft region.

8. The inlet diffuser of claim 1, wherein a perpendicular distance between the internal surface and the apex portion of the wall face at a particular location of the wall face is greater than an expected thickness of the first portion of boundary layer air in a channel region proximate to the particular location of the wall face when the first portion of boundary layer air flows within the channel at normal operating velocities.

9. The inlet diffuser of claim 1, wherein the ramp face of the respective elongate structure is configured to:

(i) allow a second portion of boundary layer air located outboard of the respective elongate structure to flow across the ramp face of the respective elongate structure and into a region of the internal volume inward of the channel, and (ii) push the second portion of boundary layer air away from the internal surface of the internal volume as the second portion of boundary layer air flows across the ramp face of the respective elongate structure.

10. The inlet diffuser of claim 1, wherein a front end of each elongate structure proximate to the inlet is configured to split incoming boundary layer air into the first portion of boundary layer air and a second portion of boundary layer air.

11. The inlet diffuser of claim 1, wherein a width of the respective elongate structure changes over a longitudinal length of the respective elongate structure.

12. The inlet diffuser of claim 1, wherein the pair of elongate structures is a first pair of elongate structures, and the inlet diffuser further comprises a second pair of elongate structures.

13. The inlet diffuser of claim 12, wherein the internal surface of the internal volume includes a centerline that bisects the internal surface and extends from the inlet of the internal volume to the exit of the internal volume, and individual elongate structures of the first pair of elongate structures are equally spaced from the centerline.

14. A method of diffusing incoming air of a jet engine, the method comprising:

receiving air into an internal volume defined by a body of an inlet diffuser;

splitting a lower boundary of the air within the inlet diffuser into a first portion of boundary layer air and a second portion of boundary layer air, wherein the first portion of boundary layer air is located between the second portion of boundary layer air;

directing the second portion of boundary layer air to flow upward and inward as the second portion of boundary layer air flows through the internal volume towards an exit of the inlet diffuser; and delivering, via the exit of the inlet diffuser, the air to a downstream portion of the jet engine.

15. The method of claim 14, further comprising allowing the first portion of boundary layer air to flow within a channel of the internal volume.

16. The method of claim 15, wherein directing the second portion of boundary layer air to flow upward and inward comprises:

allowing the second portion of boundary layer air to flow in an inboard direction into a region of the internal volume inward of the channel; and causing the second portion of boundary layer air to mix with a high energy airflow inward of the channel as the second portion of boundary layer air flows through the internal volume towards the exit of the inlet diffuser.

17. The method of claim 15, further comprising restricting the first portion of boundary layer air from flowing in an outboard direction as the first portion of boundary layer air travels within the channel.

18. The method of claim 14, further comprising causing the second portion of boundary layer air to travel in an inboard direction as the second portion of boundary layer air flows through the internal volume towards the exit of the inlet diffuser.

19. An inlet diffuser for a jet engine, the inlet diffuser comprising:

a diffuser body defining an internal volume and having an inlet to the internal volume for receiving incoming ambient air and an exit from the internal volume for delivering the air to a downstream portion of the jet engine, wherein the diffuser body has an internal surface facing the internal volume, the internal surface comprising a fore region proximate to the inlet and an aft region downstream of the fore region and proximate to the exit, and a pair of elongate structures extending longitudinally along the internal surface from the fore region of the internal surface to the aft region of the internal surface, wherein the pair of elongate structures defines a channel of the internal volume inboard of the elongate structures;

wherein a respective elongate structure of the pair of elongate structures comprises a wall face extending substantially perpendicular to the internal surface of the inlet diffuser and extending along a longitudinal length of the respective elongate structure, wherein the wall face is an inboard surface of the respective elongate structure and is configured to restrict a first portion of boundary layer air from flowing across the respective elongate structure, wherein the wall face comprises an apex portion opposite the internal surface, and wherein a perpendicular distance between the internal surface and the apex portion of the wall face at a particular location of the wall face is greater than an expected thickness of the first portion of boundary layer air in a channel region proximate to the particular location of the wall face when the first portion of boundary layer air flows within the channel at normal operating velocities.

20. An inlet diffuser for a jet engine, the inlet diffuser comprising:

a diffuser body defining an internal volume and having an inlet to the internal volume for receiving incoming ambient air and an exit from the internal volume for delivering the air to a downstream portion of the jet engine, wherein the diffuser body has an internal surface facing the internal volume, the internal surface comprising a fore region proximate to the inlet and an aft region downstream of the fore region and proximate to the exit, and a pair of elongate structures extending longitudinally along the internal surface from the fore region of the internal surface to the aft region of the internal surface, wherein the pair of elongate structures defines a channel of the internal volume inboard of the elongate structures, and wherein a width of a respective elongate structure changes over a longitudinal length of the respective elongate structure.

21. An inlet diffuser for a jet engine, the inlet diffuser comprising:

a diffuser body defining an internal volume and having an inlet to the internal volume for receiving incoming ambient air and an exit from the internal volume for delivering the air to a downstream portion of the jet engine, wherein the diffuser body has an internal surface facing the internal volume, the internal surface comprising a fore region proximate to the inlet and an aft region downstream of the fore region and proximate to the exit, a first pair of elongate structures extending longitudinally along the internal surface from the fore region of the internal surface to the aft region of the internal surface, wherein the first pair of elongate structures defines a channel of the internal volume inboard of the first pair of elongate structures, and a second pair of elongate structures extending longitudinally along the internal surface from the fore region of the internal surface to the aft region of the internal surface, wherein the elongate structures of the second pair of elongate structures are outboard of the first pair of elongate structures.

22. The inlet diffuser of claim 1, wherein the inlet diffuser has a maximum width and a maximum height, and wherein the maximum width is at least two times the maximum height.

* * * * *